United States Patent
Prakash

(10) Patent No.: US 7,529,688 B2
(45) Date of Patent: May 5, 2009

(54) BASELINE COST SAVINGS ANALYSIS

(75) Inventor: Balasubramanian Arun Prakash, Santa Clara, CA (US)

(73) Assignee: i2 Technologies US, Inc., Dallas, TX (US)

( * ) Notice: Subject to any disclaimer, the term of this patent is extended or adjusted under 35 U.S.C. 154(b) by 1080 days.

(21) Appl. No.: 09/957,831

(22) Filed: Sep. 21, 2001

(65) Prior Publication Data

US 2002/0143677 A1 Oct. 3, 2002

Related U.S. Application Data

(60) Provisional application No. 60/279,304, filed on Mar. 27, 2001.

(51) Int. Cl.
*G06Q 30/00* (2006.01)

(52) U.S. Cl. .......................................... 705/26; 705/30

(58) Field of Classification Search ............... 705/1–45, 705/400–405, 409, 415–416, 26
See application file for complete search history.

(56) References Cited

U.S. PATENT DOCUMENTS

2002/0123945 A1* 9/2002 Booth et al. .................. 705/30

OTHER PUBLICATIONS

Roger Hermanson et al., "Accounting Principles", 1989, BPI/Irwin, Fourth Edition, pp. 978-984,998-1000.*
Letricia Rayburn, "Principles of Cost Accounting with Managerial Applications", 1979, Richard D. Irwin Inc., pp. 373-375.*
Alan L. Eliason, "Online Business Computer Applications," 1987, Science Research Associates, Second Edition, pp. 1-9, 29-41.*

* cited by examiner

*Primary Examiner*—Jagdish N Patel
*Assistant Examiner*—Sara Chandler
(74) *Attorney, Agent, or Firm*—Steven J. Laureanti; Booth Udall, PLC

(57) ABSTRACT

In one embodiment of the present invention, a cost savings analysis system includes one or more software components. The software components collectively receive from a user one or more first inputs specifying a cost savings goal and one or more second inputs specifying a technique for generating a baseline price. The software components collectively access historical transaction data within one or more databases needed to generate a baseline price according to the specified technique, generate the baseline price, determine a variation between the generated baseline price and an actual price for each of one or more transactions corresponding to the specified cost savings goal, and compare the determined variations for the one or more transactions with the specified cost savings goal to conduct a baseline cost savings analysis.

24 Claims, 2 Drawing Sheets

FIG. 2

| 26a | 26b | 26c | 26d | 26e | 26f | 26g | |
|---|---|---|---|---|---|---|---|
| TRANSACTION NUMBER | TRANSACTION DATE | ITEM NUMBER | PURCHASE PRICE | BASELINE PRICE | PURCHASE PRICE VARIATION FROM BASELINE PRICE (AMOUNT) | PURCHASE PRICE VARIATION FROM BASELINE PRICE (PERCENTAGE) | |
| 123 | 12-DEC-00 | 12-345 | $5.00 | $4.75 | +$0.25 | +5.26% | ○ ○ ○ |
| 456 | 5-JAN-01 | 12-345 | $5.00 | $5.00 | $0.00 | 0.00% | ○ ○ ○ |
| 789 | 5-FEB-01 | 12-345 | $4.75 | $5.25 | -$0.50 | -9.52% | ○ ○ ○ |
| 101112 | 23-FEB-01 | 12-345 | $5.25 | $5.25 | $0.00 | 0.00% | ○ ○ ○ |
| 131415 | 6-MAR-01 | 12-345 | $5.50 | $5.00 | +$0.50 | +10.00% | ○ ○ ○ |
| 161718 | 19-MAR-01 | 12-345 | $5.75 | $5.00 | +$0.75 | +15.00% | ○ ○ ○ |
| ○ ○ ○ | ○ ○ ○ | ○ ○ ○ | ○ ○ ○ | ○ ○ ○ | ○ ○ ○ | ○ ○ ○ | |

BASELINE COST SAVINGS ANALYSIS

RELATED APPLICATION

This application claims the benefit under 35 U.S.C. §119 (e) of U.S. Provisional Application No. 60/279,304, filed Mar. 27, 2001.

TECHNICAL FIELD OF THE INVENTION

This invention relates generally to business procurement and more particularly to baseline cost savings analysis.

BACKGROUND OF THE INVENTION

Organizations may purchase items from one or more suppliers. Actual costs (meaning costs associated with making such purchases) may be compared with certain budgeted costs or expected costs to calculate costs savings (or overages) that have been realized by an organization over a period of time. Such cost savings analyses may be conducted for particular organizations, suppliers, items, and time periods. Due to data cleanup issues and contract negotiations in progress, however, cost savings reports may give an unrealistic picture of cost savings until the data for generating such reports reaches a relatively steady state.

SUMMARY OF THE INVENTION

According to the present invention, disadvantages and problems associated with previous cost savings analysis techniques may be reduced or eliminated.

In one embodiment of the present invention, a cost savings analysis system includes one or more software components. The software components collectively receive from a user one or more first inputs specifying a cost savings goal and one or more second inputs specifying a technique for generating a baseline price. The software components collectively access historical transaction data within one or more databases needed to generate a baseline price according to the specified technique, generate the baseline price, determine a variation between the generated baseline price and an actual price for each of one or more transactions corresponding to the specified cost savings goal, and compare the determined variations for the one or more transactions with the specified cost savings goal to conduct a baseline cost savings analysis.

Particular embodiments of the present invention may provide one or more technical advantages. For example, in certain embodiments of the present invention, costs associated with one or more items may be compared with a baseline price to conduct a baseline cost savings analysis, which may include a comparison of actual cost savings with a cost savings goal stated in terms of the baseline price. Cost savings goals may be defined by items, suppliers, time frames, units within an organization, personnel within an organization, and other suitable parameters, allowing certain embodiments of the present invention to measure target costs and productivity gains against target spending and productivity goals and track performance and savings against productivity and savings goals, which may constitute an important part of an annual operating plan for a business. Certain embodiments may provide visibility allowing analysis of spending by supplier to facilitate negotiations with particular suppliers and supplier transition. Certain embodiments may monitor deviations between actual costs and target spending and productivity goals and alert certain users when such deviations reach a certain threshold, which may provide substantially real-time information for making changes to a business plan when spending is not meeting set goals. In this way, progress toward cost savings goals may be monitored to determine whether efforts to meet those goals should be increased or otherwise modified. Additionally, certain embodiments may allow users to monitor, analyze, and evaluate the performance of purchasing organizations and individual purchasers.

Systems and methods incorporating one or more of these or other technical advantages may be well suited for modem business procurement environments. Other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2 illustrates an example table containing example transaction records; and

DETAILED DESCRIPTION OF EXAMPLE EMBODIMENTS

Figure 1:
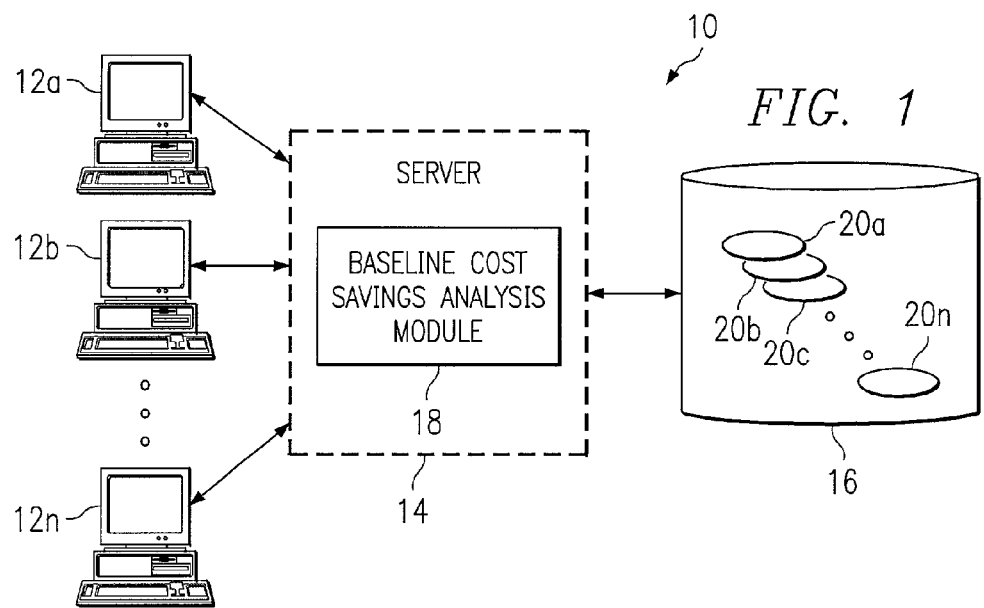
FIG. 1 illustrates an example baseline cost savings analysis system.

FIG. 1 illustrates an example baseline cost savings analysis system 10. System 10 may include one or more client systems 12 coupled to server system 14, which may in turn be coupled to object-oriented or other suitable database system 16. Server system 14 may support a baseline cost savings analysis module 18, and database system 16 may include one or more object classes 20 from which various objects may be generated for conducting baseline cost savings analyses. Baseline cost savings analysis module 18 may access classes 20 to generate specific objects for conducting a particular baseline cost savings analysis according to one or more parameters or other inputs received from a user via a client system 12. Additionally, there may be one or more scripts or other software components that may interact with classes 20 and objects generated from classes 20 to exchange data and calculate, for example, baseline savings for individual transaction records and other values. Such software components may be executed by hardware associated with server system 14, database system 16, or other devices internal or external to system 10 for executing software.

Classes 20, objects generated from classes 20, and the software components described above may access transactional and other data within one or more relational database systems internal or external to system 10 to carry out various tasks associated with such an analysis. For example, one or more relational database systems may include one or more tables containing a number of transaction records. A transaction record may include information reflecting various aspects of a particular transaction, such as a purchase price for the items involved in the transaction and a transaction date. FIG. 2 illustrates an example table 22 containing transaction records. Table 22 may include a number of rows 24, each corresponding to a particular transaction record, and a number of columns 26, each corresponding to a particular aspect of the recorded transactions. Each row 22 (meaning each transaction record) may include one or more values for each of these aspects, thereby providing information regarding each particular transaction. For example, table 22 may include transaction number column 26a containing transaction numbers uniquely identifying the recorded transactions. Table 22 may also include transaction date column 26b containing information reflecting the dates on which the recorded transactions took place. Item number column 26c may contain information identifying items involved in the transactions. Purchase price column 26d may contain information reflecting the per-item price for the recorded transactions. Baseline price column 26e may contain information generated as described more fully below reflecting baseline prices for the recorded transactions. Purchase price variation from baseline price (amount) column 26f may contain information reflecting the differences between the purchase prices and the baseline prices for the recorded transactions stated in terms of a monetary amount. Purchase price variation from baseline price (percentage) column 26g may contain information reflecting the differences between the purchase prices and the baseline prices for the recorded transactions stated in terms of a percentage.

Referring again to FIG. 1, classes 20, objects generated from classes 20, and the software components described above may also generate and access various reports, which may include a "savings by item" report, a "year-to-date comparison of savings with goals" report, a "year-to-date savings and potential savings by supplier for current year" report, a "savings by site, item, and quarter" report, and a "savings by supplier group and quarter" report. Generated or accessed reports may include any suitable combination of time, supplier, organization unit, item, and other dimensions.

System 10 may allow a user to compare costs associated with one or more items with a baseline price to conduct a baseline cost savings analysis, which may include a comparison of actual cost savings with a cost savings goal or other metric stated in terms of the baseline price. As described more fully below, a baseline price may represent a moving average price, an average price within a specified time frame, a price from a particular transaction or other record, a price manually entered by a user, or other suitable price. (Reference to "cost" or "price" may include an outlay for one or more items, and the terms may be used interchangeably where appropriate.) As transactions occur, transaction records may be stored, and incurred costs may be compared with a particular baseline price to calculate differences between the incurred costs for those transactions and the baseline price, which differences may be compared with a baseline cost savings goal. These comparisons may be made on a per-transaction or other suitable basis, and the results of these comparisons may be stored to allow users to analyze cost savings performance over a period of time and compare such performance with target or other goals.

When analyzing cost savings performance, an item may be "weighted" based on the percentage of total costs (or a particular subset of the total costs) incurred by an organization associated with that particular item. For example, a manufacturer may regularly purchase sheet metal, ball bearings, office supplies, and maintenance, repair, and operations (MRO) equipment, which may together constitute all or a subset (such as items from a particular supplier) of items purchased by the manufacturer. Of the total costs associated with all of these items, costs associated with sheet metal may represent forty percent, costs associated with ball bearings may represent twenty percent, costs associated with office supplies may represent twenty percent, and costs associated with MRO equipment may represent twenty percent. The manufacturer may set a goal of reducing total costs associated with all of these items by five percent over the current year from the previous year. Since, in this example, sheet metal may represent forty percent of the total costs associated with these items, productivity gains (or losses) associated with sheet metal over the current year may be weighted by multiplying the percent gains by the percentage of total costs that the costs associated with sheet metal represent. This number may then be added to the weighted percent gains for the other items to generate an aggregate percent productivity gain, and the aggregate percent productivity gain may indicate the manufacturer's progress toward meeting the productivity goal of reducing total costs by five percent for the current year. The aggregate percent productivity gain may be adjusted and monitored over the current year as transactions involving these items occur, enabling the manufacturer to make better informed decisions about how to meet productivity goals.

Analyzing cost savings performance over a period of time relative to a baseline price and comparing such performance with target or other goals may provide visibility, allowing users to monitor progress toward productivity, target spending, and other cost savings goals, which may constitute an important part of the annual operating plan of a business. Additionally, users may be alerted when deviations between actual costs and cost savings goals reach a certain threshold, which may provide substantially real-time information for making changes to a business plan when actual costs are not meeting set goals. Users may also evaluate purchasing organizations and the performance of individual purchasers based on the results of certain baseline cost savings analyses. System 10 may also provide for analysis and reporting of cost savings to support supplier rationalization and transitions and cost savings goal initiatives. For example, data an other information derived from baseline savings analyses may be presented to individual suppliers to facilitate negotiation between the purchaser and the suppliers.

In one embodiment, classes 20 may include a cost savings goal class 20a, a baseline price class 20b, a baseline configuration class 20c, a receipt transaction history operational table class 20d, a demand data operation table class 20e, a purchase order (PO) item operation table class 20f, an approved vendor list table class 20g, a supplier allocation fact table class 20h, a spend-by-supplier fact table class 20i, and a projected savings by supplier fact table class 20j.

A cost savings goal may be stated in terms of a percentage relative to a baseline price or a monetary amount and may include parameters specifying one or more items (which may include raw materials, component parts, products, or other tangible or intangible things), suppliers, time frames, units within an organization, personnel within an organization, or other suitable parameters. For example, a cost savings goal may be stated in terms of a certain percentage reduction in costs associated with a particular item over the course of a year relative to the preceding year. As another example, a cost savings goal may be stated in terms of a certain percentage reduction in costs associated with all items purchased from a particular supplier over a certain period of time relative to a preceding period of time. A set cost savings goal may be modified according to particular needs. For example, a goal may be modified in response to inflation.

Accordingly, cost savings goal class 20a may allow a user to define a cost savings goal in terms of items, suppliers, time, units within an organization, personnel within an organization, and other suitable parameters and specify a cost savings goal as a percentage relative to a baseline price or as a monetary amount. Based on a cost savings goal specified in an object generated from cost savings goal class 20a (which may be referred to as a "cost savings goal object"), a point-in-time comparison may be made between the cost savings goal and historical cost savings, between the cost savings goal and committed savings, and between the cost savings goal and projected savings. Additionally, actual cost savings may be compared with a cost savings goal to analyze and, if desired, make adjustments to the goal. A cost savings goal object may be specific to one or more items, suppliers, time frames, units within an organization, or personnel within an organization. Accordingly, a cost savings goal object may include properties such as a commodity dimension, a supplier dimension, a time dimension, a organization dimension, and a buyer dimension. These properties may include one or more pointers to different objects accessible to objects generated from classes 20. A cost savings goal object may also include a target savings percentage and a target savings amount, which may specify a particular cost savings goal relative to an effective baseline price, described more fully below.

Baseline price class 20b may allow a user to store baseline costs associated with one or more items. Such costs may be current or historical. An object generated from baseline price class 20b (which may be referred to as a "baseline price object") may be specific to one or more items and an effective date. Accordingly, a baseline price object may include properties specifying one or more particular items and an effective date. Associating baseline price objects with effective dates may allow historical baseline price information to be stored and may allow a user to conduct trend analyses of baseline prices. A baseline price object may also include properties for different baseline prices for those items, each calculated using different methods. Such properties may include an average rolling twelve-month price, an average year-to-date price, an average previous calendar year price, and a last paid price. A baseline price object may also include an effective baseline price and an effective baseline price method.

An average rolling twelve-month price value within a baseline price object may represent the total monetary amount actually spent on the specified items over a twelve-month period divided by the received quantity of those items over the same twelve-month period. The twelve-month period may include the month for which operation data are being loaded and the preceding eleven months. For example, when operation data for February, 2001, are being loaded, the twelve-month period may be from March, 2000, to February, 2001. The average rolling twelve-month price value within a baseline price object may be substantially read-only. For example, this price may be updated only by external scripts or other software created for modifying this property.

An average year-to-date price value within a baseline price object may represent the total monetary amount spent on the specified items from the beginning of the calendar year to the current full load month divided by the received quantity of those items over the same period. For example, when operation data for February, 2001, are being loaded, the year-to-date period may include January and February, 2001. The average year-to-date price value within an object generated from the baseline price class 20b may also be substantially read-only.

An average previous calendar year price value within a baseline price object may represent the monetary amount spent on the specified items over the preceding calendar year divided by the received quantity of those items over the same period. For example, when operation data for February, 2001, are being loaded, the average previous calendar year may include the year 2000. The average previous calendar year price value within a baseline price object may also be substantially read-only.

A last paid price value within a baseline price object may represent the purchase price for the specified items on the most recently dated transaction record for those items. For example, when operation data for February, 2001, are being loaded, the last paid price may represent the last recorded purchase price for those items from the last day of February, 2001, going back in time twelve months. The last paid price value within a baseline price object may also be substantially read-only.

An effective baseline price value within a baseline price object may include an above-described price for the items associated with that object or a price manually provided by an authorized user. The effective baseline price may be determined by the properties of a corresponding baseline configuration object, described more fully below. Additionally, the current baseline price for a baseline price object may be manually edited by authorized users, who may be required to provide a reason for the changes made. For example, a user who has manually edited this field may be required to select a reason from a list of reasons provided to the user before the changes that were made become effective. If the properties of the corresponding baseline configuration object indicate that the current baseline price is to be entered manually, the software for providing a current baseline price may not give this property a value, instead allowing an authorized user to provide a suitable value for the current baseline price.

An effective baseline price method value within a baseline price object may reflect how the effective baseline price was determined. For example, the value for the baseline price method for a generated object may be "direct load," "average rolling twelve-month price," "average year-to-date price," "average previous calendar year price," "last paid price," "first paid price," "standard cost," or "manual edit." The properties of a corresponding baseline configuration object, described more fully below, may determine the baseline price method value within a baseline price object. The baseline price method specified within a baseline price object may be manually edited by authorized users.

Scenarios may arise where a value for one of the prices described above may not be properly calculated. Where such scenarios arise, one or more "exception handling" techniques may be used to generate a value. For example, where transaction data for the relevant manufacturing inputs are not available for the entire preceding twelve-month period, the average rolling twelve-month price may be calculated using available data going back as far as possible within the last twelve months. As another example, where transaction data for the relevant manufacturing inputs are not available for the previous calendar year, the average previous calendar year price may be given a null value. Although specific examples of exception handling techniques have been described, any suitable technique may be used in any suitable exception scenario. Additionally, suitable exception handling techniques may be used to generate values for certain properties of other objects generated from other classes 20 when exception scenarios arise.

Baseline configuration class 20c may be used to define configurations and other settings for calculating a baseline price and baseline cost savings, which may provide users greater flexibility in conducting baseline cost savings analyses. An object generated from baseline configuration class 20c (which may be referred to as a "baseline configuration object") may be specific to a particular effective date. Accordingly, an object generated from baseline configuration class 20c may include a property specifying an effective date. Associating an object generated from baseline configuration class 20c with an effective date may allow settings that produced particular baseline cost and baseline cost savings figures to be stored and provided to a user for baseline cost savings analysis or other suitable purposes. Additionally, users may be prevented, using a suitable technique, from modifying the property values for a baseline configuration object, which may also preserve settings for analysis and other purposes. A baseline configuration object may also include various properties specifying different settings for calculating a baseline price and baseline cost savings. Such properties may include a baseline price method, an item compute baseline, and a baseline price null action.

The baseline price method value within a baseline configuration object may specify a method for generating an effective baseline price value for a baseline price object. Baseline price method values may include "direct load," "average rolling twelve-month price," "average year-to-date price," "average previous calendar year price," and "manual edit." Scripts may access the baseline price method value within a baseline configuration object to determine an effective baseline price for a baseline price object. If the baseline price method value is "direct" or "manual edit," the scripts may not generate an effective baseline price for a baseline price object, instead only calculating values for the other properties of the baseline price object.

The item compute baseline value within a baseline configuration object may specify whether a baseline cost savings analysis involves a particular item, a set of items, or all items. Scripts calculating baseline prices for a baseline price object may access the item compute baseline value within a baseline configuration object to determine whether to calculate baseline prices for a particular item, a set of items, or all items.

There may be no recorded transactions for certain items. As a result, there may be items specified by a baseline price object for which there is no baseline price record in the baseline price object. To address this potential problem, the baseline price null action value within a baseline configuration object may determine the actions of the baseline price check/retrieval script during the receipt loading process when the script is unable to locate a match for the items specified by the baseline price object. Baseline price null action values may include "no action" and "first paid price/standard cost." If the baseline price null action value in the baseline configuration object is "no action," the baseline price check/retrieval script may give the baseline price in the transaction record a null value. If, on the other hand, the baseline price null action value is "first paid price/standard cost," the baseline price check/retrieval script may, if the item compute baseline value for the baseline configuration object is "all items" or the item specified in the transaction record is in the category specified by the item compute baseline value, set the purchase price appearing in the transaction record as the baseline price in the transaction record. Additionally, a baseline price object may be generated and given an effective date matching the transaction date appearing in the transaction record. In the generated baseline price object, the purchase price appearing in the transaction record may be set as the baseline price, and the baseline price method may be set as "first price paid." If the item specified in the transaction record does not comply with the item baseline compute value in the baseline configuration object, the baseline price in the transaction record may be given a null value.

The baseline price null action value within a baseline configuration object may also determine the actions of the baseline price check/retrieval script during the demand data loading process when the script is unable to locate a match for the items specified by the baseline price object. If the baseline price null action value for the baseline configuration object is "no action," the baseline price check/retrieval script may give the baseline unit price for the demand data object a null value. If, on the other hand, the baseline price null action value is "first paid price/standard cost," the baseline price check/retrieval script may, if the item compute baseline value for the baseline configuration object is "all items" or the item specified by the demand data object is in the category specified by the item compute baseline value, set the standard cost as the baseline price in the demand data object. Additionally, a baseline price object may be generated and given an effective date matching the transaction date appearing in the transaction record. In the generated baseline price object, the standard cost may be set as the baseline price, and the baseline price method may be set as "standard cost." If the item specified by the demand data object does not comply with the item baseline compute value in the baseline configuration object, the baseline unit price in the demand data object may be given a null value.

An object generated from receipt transaction history operational table class $20d$ (which may be referred to as a "receipt transaction history operational table object") may include properties such as a baseline unit price (local), a baseline unit price (base), a baseline amount (local), a baseline amount (base), and a baseline savings. The baseline unit price may be determined at the time of staging and loading of the transaction records and may be determined by accessing a baseline price object. The baseline unit price (local) value within a receipt transaction history operational table object may be determined as follows. When receipt data are being loaded, the baseline price in the baseline price object for the corresponding items may be accessed. If there is more than one baseline price object for an item, the baseline price object having the effective date closest (going back it time) to the transaction date appearing in the transaction record may be selected. As described above, the baseline price null action value within a baseline configuration object may determine the actions of the baseline price check/retrieval script during the receipt loading process when the script is unable to locate a match for the items specified by the baseline price object. If the baseline price null action value in the baseline configuration object is "no action," the baseline price check/retrieval script may give the baseline price in the transaction record a null value. If, on the other hand, the baseline price null action value is "first paid price/standard cost," the baseline price check/retrieval script may, if the item compute baseline value for the baseline configuration object is "all items" or the item specified in the transaction record is in the category specified by the item compute baseline value, set the purchase price appearing in the transaction record as the baseline price in the transaction record. Additionally, a baseline price object may be generated and given an effective date matching the transaction date appearing in the transaction record. In the generated baseline price object, the purchase price appearing in the transaction record may be set as the baseline price, and the baseline price method may be set as "first price paid." If the item specified in the transaction record does not comply with the item baseline compute value in the baseline configuration object, the baseline price in the transaction record may be given a null value.

The baseline unit price (base) value within a receipt transaction history operational table object may include a standard conversion of the baseline unit price (local) in the object to a base currency, which may be similar to converting an actual item cost. The baseline amount (local) value within a receipt transaction history operational table object may represent the baseline unit price in the object multiplied by the receipt quantity. The baseline amount (base) value within a receipt transaction history operational table object may include a standard conversion of the baseline amount (local) in the object to a base currency. The baseline savings value within a receipt transaction history operational table object may represent the difference between the baseline amount in the object minus the actual amount. The baseline savings value may be positive or negative. Exception handling techniques may be used to generate values for properties of a receipt transaction history operational table object when exception scenarios arise.

An object generated from demand data operation table class 20e (which may be referred to as a "demand data operation table object") may include properties such as a baseline unit price (local), a baseline unit price (base), a baseline amount (local), a baseline amount (base), and a baseline savings (base). The baseline unit price may be determined at the time of staging and loading the demand records, and may be determined by accessing the baseline price object. An external utility may provide users flexibility in recalculating the savings for demand data. Such a utility may take a "from" date and a "to" date as inputs. When the script for recalculating the savings for demand data is executed, the script may update the baseline unit price, baseline amount, and baseline savings amount for all of the demand data records between the "from" and "to" dates.

The baseline unit price (local) value within a demand data operation table object may be determined as follows. When the demand data operation table is being loaded, the baseline price in the baseline price object for the corresponding items may be accessed. If there is more than one baseline price object for an item, the baseline price object having the effective date closest (going back it time) to the demand date may be selected. As described above, the baseline price null action value within a baseline configuration object may also determine the actions of the baseline price check/retrieval script during the demand data loading process when the script is unable to locate a match for the items specified by the baseline price object. If the baseline price null action value for the baseline configuration object is "no action," the baseline price check/retrieval script may give the baseline unit price for the demand data object a null value. If, on the other hand, the baseline price null action value is "first paid price/standard cost," the baseline price check/retrieval script may, if the item compute baseline value for the baseline configuration object is "all items" or the item specified by the demand data object is in the category specified by the item compute baseline value, set the standard cost as the baseline price in the demand data object. Additionally, a baseline price object may be generated and given an effective date matching the transaction date appearing in the transaction record. In the generated baseline price object, the standard cost may be set as the baseline price, and the baseline price method may be set as "standard cost." If the item specified by the demand data object does not comply with the item baseline compute value in the baseline configuration object, the baseline unit price in the demand data object may be given a null value.

The baseline unit price (base) value within a demand data operation table object may include a standard conversion of the baseline unit price (local) in the object to a base currency, which may be similar to converting an actual item cost. The baseline amount (local) value within a demand data operation table object may represent the baseline unit price in the object multiplied by the receipt quantity. The baseline amount (base) value within a demand data operation table object may include a standard conversion of the baseline amount (local) in the object to a base currency. The baseline savings value within a demand data operation table object may represent the difference between the baseline amount in the object minus the actual amount. The baseline savings value may be positive or negative. Exception handling techniques may be used to generate values for properties of a demand data operation table object when exception scenarios arise.

An object generated from PO item operation table class 20f (which may be referred to as a "PO item operation table object") may include properties such as a baseline unit price (local), a baseline unit price (base), a baseline amount (local), a baseline amount (base), and a baseline savings (base). The baseline unit price may be determined at the time of staging and loading of the PO item records and may be determined by accessing a baseline price object. The baseline unit price (local) value within a PO item operation table object may be determined as follows. When the PO item data operation table is being loaded, the baseline price in the baseline price object for the corresponding items may be accessed. If there is more than one baseline price object for an item, the baseline price object having the effective date closest (going back it time) to the PO date. As described above, the baseline price null action value within a baseline configuration object may determine the actions of the baseline price check/retrieval script during the receipt loading process and the demand data loading process when the script is unable to locate a match for the items specified by the baseline price object. Additionally, the baseline price null action value may determine the actions of the baseline price check/retrieval script during the PO item loading process when the script is unable to locate a match for the items specified by the baseline price object. If the baseline price null action value in the baseline configuration object is "no action," the baseline price check/retrieval script may give the baseline unit price in the PO item record a null value. If, on the other hand, the baseline price null action value is "first paid price/standard cost," the baseline price check/retrieval script may, if the item compute baseline value for the baseline configuration object is "all items" or the item specified in the PO item record is in the category specified by the item compute baseline value, set the item unit cost as the baseline price. Additionally, a baseline price object may be generated and given an effective date matching the PO date. In the generated baseline price object, the item unit cost may be set as the baseline price, and the baseline price method may be set as "first price paid." If the item specified in the PO item does not comply with the item baseline compute value in the baseline configuration object, the baseline price in the PO item record may be given a null value.

The baseline unit price (base) value within a PO item operation table object may include a standard conversion of the baseline unit price (local) in the object to a base currency, which may be similar to converting an actual item cost. The baseline amount (local) value within a PO item operation table object may represent the baseline unit price in the object multiplied by the receipt quantity. The baseline amount (base) value within a PO item operation table object may include a standard conversion of the baseline amount (local) in the object to a base currency. The baseline savings value within a PO item operation table object may represent the difference between the baseline amount in the object minus the actual amount. The baseline savings value may be positive or negative. Exception handling techniques may be used to generate values for properties of a PO item operation table object when exception scenarios arise.

An object generated from approved vendor list table class 20g (which may be referred to as an "approved vendor list table object") may include properties such as a demand value price (base), which may be used in determining a suitable price for a supplier-item combination to calculate projected baseline savings for a supplier allocation fact table object. A standard cost may not be used for this purpose, since a standard cost may be an across-the-board price for the item and not a supplier-specific price. An external utility may determine the demand value price, which utility may be executed after the receipts and PO operational data have been loaded. A demand value price (base) value in an approved vendor list table object may represent the current contract price within a contract involving an item and a supplier. If, however, there is no record of a contract involving an item and a supplier or if the contract involves an order quantity-based pricing method, the current open PO price or the price appearing in the most recent transaction record may be used as the demand value price (base) value. Exception handling techniques may be used to generate values for properties of an approved vendor list table object when exception scenarios arise.

An object generated from supplier allocation fact table class 20h (which may be referred to as a "supplier allocation fact table object) may include properties such as historical savings, open PO savings, current supplier allocation (CSA) savings, and potential supplier allocation (PSA) savings. A historical savings value within a supplier allocation fact table object may represent the baseline savings (base) value in the receipt transaction history operational table object for all of the transactions within the pre-determined time frame defined when the supplier allocation fact table object is deployed. An open PO savings value within a supplier allocation fact table object may represent the open PO savings amount from the PO table for all of the open POs within the pre-determined time fame defined when the supplier allocation fact table object is deployed. A CSA savings value within a supplier allocation fact table object may represent the CSA savings amount from the combined demand and approved vendor list table for all of the demand within the pre-determined time frame defined when the supplier allocation fact table object is deployed. A PSA savings value within a supplier allocation fact table object may represent the PSA savings amount from the combined demand and approved vendor list table for all of the demand within the pre-determined time frame defined when the supplier allocation fact table object is deployed. Exception handling techniques may be used to generate values for properties of an approved vendor list table object when exception scenarios arise.

An object generated from spend by supplier fact table class 20i (which may be referred to as a "spend by supplier fact table object") may include properties such as baseline cost savings (base). A loading script for spend by supplier fact table objects may load the savings amount from the receipt transaction history operational table object. A baseline cost savings (base) within a spend by supplier fact table object may represent the baseline cost savings in the receipt transaction history operational table object. Exception handling techniques may be used to generate values for properties of a spend by supplier fact table object when exception scenarios arise.

An object generated from projected savings by supplier fact table class 20j (which may be referred to as a "projected savings by supplier fact table object") may provide a user a complete picture of cost savings for a particular supplier for the current year, which may include the year-to-date actual savings and projected savings for the remainder of the year. Projected savings by supplier fact table class 20j may enable trend analyses based on a comparison of actual and projected savings for the current year with actual savings for the previous year for a particular supplier. Additionally, projected savings by supplier fact table class 20j may allow a comparison of a cost savings goal with actual and projected savings for a particular supplier over a period of time and a "status check" on progress toward that cost savings goal. A projected savings by supplier fact table object may be specific to one or more items, suppliers, time frames, and units within an organization. Accordingly a projected savings by supplier fact table object may include properties such as a commodity dimension, a supplier dimension, a time dimension, and an organization dimension. These properties may include one or more pointers to different objects accessible to objects generated from classes 20. A projected savings by supplier fact table object may also include a projected baseline cost savings, which may represent a baseline amount within a demand data operation table object minus a demand quantity from the demand data operation table object to which has been applied an approved vendor list supplier allocation percentage from an approved vendor list table object multiplied by an approved vendor list demand value price from the approved vendor list table object. Exception handling techniques may be used to generate values for properties of a spend by supplier fact table object when exception scenarios arise.

Figure 3:
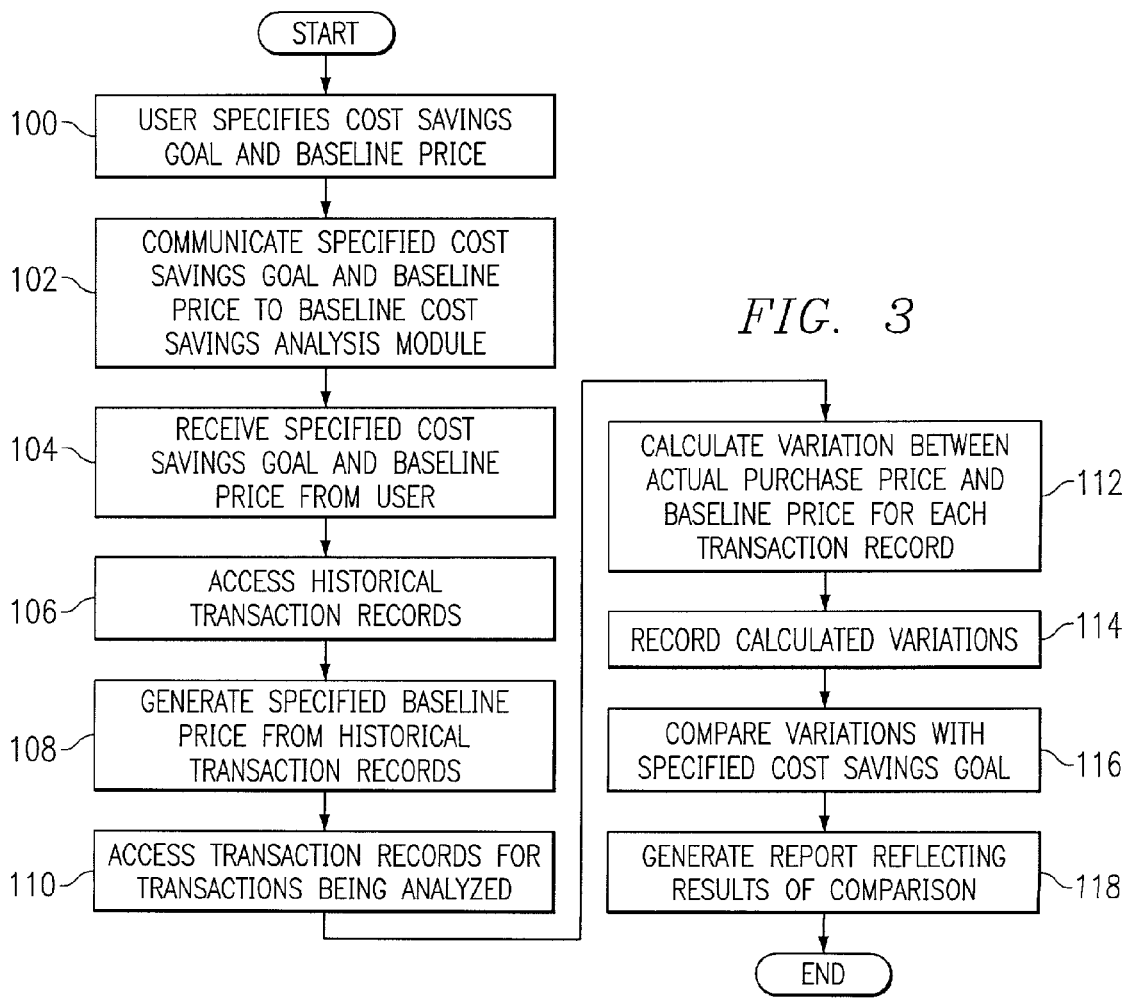
FIG. 3 illustrates an example method for conducting a baseline cost savings analysis.

FIG. 3 illustrates an example method for conducting a baseline cost savings analysis. The method begins at step 100, where a user specifies a cost savings goal and a baseline price. As described above, a cost savings goal may be defined by one or more items, suppliers, time frames, units within an organization, personnel within an organization, or other suitable parameters and may specify a monetary amount or percentage relative to a baseline price as a goal. As further described above, possible baseline prices may include a moving average price, an average price over a specified period of time, am actual price from a particular transaction, a price manually entered by a user, or other suitable price. At step 102, the specified cost savings goal and baseline price are communicated to baseline cost savings analysis module 18, and baseline cost savings analysis module 18 receives the specified cost savings goal and baseline price at step 104. Although baseline cost savings analysis module 18 is described as receiving the specified cost savings goal and baseline price at step 104, any suitable software component executed at one or more computers internal or external to system 10 may perform a task described in reference to FIG. 3, as appropriate.

At step 106, baseline cost savings analysis module 18 accesses historical transaction records, which, as described above may be stored in one or more relational databases accessible to baseline cost savings analysis module, to generate the specified baseline price. For example, if the user-specified baseline price is a twelve-month moving average price, baseline cost savings analysis module 18 may access the transaction records for all transactions matching the cost savings goal parameters (that is, those transactions that involve the items, suppliers, time frames, units within an organization, and personnel within an organization defining the user-specified cost savings goal) for the preceding twelve months. At step 108, baseline cost savings analysis module 18 generates the specified baseline price from the historical transaction records accessed at step 106 and, at step 110, accesses the transaction records for transactions being analyzed, which may be recent transactions matching the cost savings goal parameters.

At step 112, baseline cost savings analysis module 18 calculates a variation between the actual purchase price and the baseline price (which may represent a cost savings (or overage)) for each transaction record accessed at step 110. The variation may be stated in terms of a monetary amount or percentage relative to the generated specified baseline price. The calculated variations are recorded at step 114 and compared with the specified cost savings goal at step 116. Such comparison may involve adding the recorded variations for a number of transactions matching the cost savings goal parameters and dividing the sum of the recorded variations by the total quantity of the items involved in the transactions being analyzed. As described above, the variations may be weighted according to a percentage of total (or a subset of total) costs associated with particular items, suppliers, time frames, units within an organization, or personnel within an organization. At step 118, baseline cost savings analysis module 18 generates a report of the comparison, and the method ends. As discussed above, any suitable report may be generated, according to particular needs.

Although the present invention has been described with several embodiments, divers changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A computer-implemented cost savings analysis system, comprising:
   one or more databases storing historical transaction data;
   a server system coupled to the one or more databases, the server system operable to:
      receive a user input specifying a cost savings goal for one or more transactions; and
      access the historical transaction data within the one or more databases needed to generate a baseline price for each of the one or more transactions, wherein the baseline price is generated based on data selected from the group consisting of the historical transaction data and data manually input by an authorized user; and
   an analysis module coupled with the server system, the analysis module operable to:
      determine the historical transaction data to generate the baseline price for each of the one or more transactions;
      responsive to a determination that the historical transaction data exists to generate the baseline price for each of the one or more transactions, generate the baseline price based on the historical transaction data for each of the one or more transactions that the historical transaction data exists;
      responsive to a determination that the historical transaction data does not exist to generate the baseline price for each of the one or more transactions, generate the baseline price according to manual input by the authorized user for each of the one or more transactions that the historical transaction data does not exist, wherein the authorized user is required to provide a reason for the baseline price;
      determine a weighted cost savings goal for each of the one or more transactions based on the specified cost savings goal for the one or more transactions and a percentage of total costs an organization allocates to a transaction type associated with each of the one or more transactions;
      determine a variation between the generated baseline price and an actual price for each of the one or more transactions, wherein the actual price reflects a per-item price for each of the one or more transactions;
      compare the determined variations for each of the one or more transactions with the weighted cost savings goal for each of the one or more transactions;
      generate a cost savings result of the comparison of the determined variations for each of the one or more transactions and the weighted cost savings goal for each of the one or more transactions; and
      alert the user when the generated cost savings result reaches a certain threshold.

2. The system of claim 1, wherein:
   the specified cost savings goal comprises a monetary amount or a percentage relative to a baseline price; and
   the determined variations comprise monetary amounts or percentages relative to the generated baseline price.

3. The system of claim 1, wherein the specified cost savings goal is for a particular combination of one or more items, suppliers, time frames, units within an organization, or personnel within an organization.

4. The system of claim 1, wherein the generated baseline price is selected from the group consisting of an average rolling twelve-month price, an average year-to-date price, an average previous calendar year price, and a last paid price.

5. The system of claim 1, wherein the one or more databases containing the historical transaction data comprise relational databases.

6. The system of claim 1, wherein the analysis module is further operable to access the historical transaction data, generate the baseline price, determine the variations for the one or more transactions corresponding to the specified cost savings goal, and compare the determined variations for the one or more transactions with the specified cost savings goal by causing one or more scripts designed for these activities to be executed.

7. The system of claim 1, wherein the server system is further operable to monitor the determined variations and alert a user when at least one variation reaches a corresponding threshold.

8. The system of claim 1, wherein the server system is further operable to access one or more classes within an object-oriented database system to generate one or more objects for conducting the cost savings analysis, each class comprising one or more properties for defining an object, each generated object comprising values for one or more of the properties within a corresponding class, the values being generated from one or more of the following:
   the first input;
   the second input;
   the historical transaction data; and
   one or more other generated objects.

9. A computer-implemented method for conducting a cost savings analysis, comprising:
   receiving, by a server, a user input specifying a cost savings goal for one or more transactions;
   accessing, by the server, historical transaction data within one or more databases needed to generate a baseline price for each of the one or more transactions, wherein the baseline price is generated based on data selected from the group consisting of the historical transaction data and data manually input by an authorized user;
   determining, by an analysis module linked to the server, the historical transaction data to generate the baseline price for each of the one or more transactions;
   responsive to a determination that the historical transaction data exists to generate the baseline price for each of the one or more transactions, generating the baseline price based on the historical transaction data for each of the one or more transactions that the historical transaction data exists;
   responsive to a determination that the historical transaction data does not exist to generate the baseline price for each of the one or more transactions, generating the baseline price according to manual input by the authorized user for each of the one or more transactions that the historical transaction data does not exist, wherein the authorized user is required to provide a reason for the baseline price;

determining, by the analysis module, a weighted cost savings goal for each of the one or more transactions based on the specified cost savings goal for the one or more transactions and a percentage of total costs an organization allocates to a transaction type associated with each of the one or more transactions;

determining, by the analysis module, a variation between the generated baseline price and an actual price for each of the one or more transactions, wherein the actual price reflects a per-item price for each of the one or more transactions;

comparing, by the analysis module, the determined variations for each of the one or more transactions with the weighted cost savings goal for each of the one or more transactions;

generating, by the analysis module, a cost savings result of the comparison of the determined variations for each of the one or more transactions and the weighted cost savings goal for each of the one or more transactions; and alerting, by the analysis module, the user when the generated cost savings result reaches a certain threshold.

10. The method of claim 9, wherein:
the specified cost savings goal comprises a monetary amount or a percentage relative to a baseline price; and
the determined variations comprise monetary amounts or percentages relative to the generated baseline price.

11. The method of claim 9, wherein the specified cost savings goal is for a particular combination of one or more items, suppliers, time frames, units within an organization, or personnel within an organization.

12. The method of claim 9, wherein the generated baseline price is selected from the group consisting of an average rolling twelve-month price, an average year-to-date price, an average previous calendar year price, and a last paid price.

13. The method of claim 9, wherein the one or more databases containing the historical transaction data comprise relational databases.

14. The method of claim 9, wherein accessing the historical transaction data, generating the baseline price, determining the variation for the one or more transactions corresponding to the specified cost savings goal, and comparing the determined variations for the one or more transactions with the specified cost savings goal comprises causing one or more scripts designed for these activities to be executed.

15. The method of claim 9, further comprising monitoring the determined variations and alerting a user when at least one variation reaches a corresponding threshold.

16. The method of claim 9, further comprising accessing one or more classes within an object-oriented database system to generate one or more objects for conducting the cost savings analysis, each class comprising one or more properties for defining an object, each generated object comprising values for one or more of the properties within a corresponding class, the values being generated from one or more of the following:
the first input;
the second input;
the historical transaction data; and
one or more other generated objects.

17. A computer-readable storage medium storing a plurality of instructions which, when executed by a computer, cause the computer to perform a method for conducting a cost savings analysis comprising:

receiving a user input specifying a cost savings goal for one or more transactions;

accessing historical transaction data within one or more databases needed to generate a baseline price for each of the one or more transactions, wherein the baseline price is generated based on data selected from the group consisting of the historical transaction data and data manually input by an authorized user;

determining the historical transaction data to generate the baseline price for each of the one or more transactions;

responsive to a determination that the historical transaction data exists to generate the baseline price for each of the one or more transactions, generating the baseline price based on the historical transaction data for each of the one or more transactions that the historical transaction data exists;

responsive to a determination that the historical transaction data does not exist to generate the baseline price for each of the one or more transactions, generating the baseline price according to manual input by the authorized user for each of the one or more transactions that the historical transaction data does not exist, wherein the authorized user is required to provide a reason for the baseline price;

determining a weighted cost savings goal for each of the one or more transactions based on the specified cost savings goal for the one or more transactions and a percentage of total costs an organization allocates to a transaction type associated with each of the one or more transactions;

determining a variation between the generated baseline price and an actual price for each of the one or more transactions, wherein the actual price reflects a per-item price for each of the one or more transactions;

comparing the determined variations for each of the one or more transactions with the weighted cost savings goal for each of the one or more transactions;

generating a cost savings result of the comparison of the determined variations for each of the one or more transactions and the weighted cost savings goal for each of the one or more transactions; and alerting the user when the generated cost savings result reaches a certain threshold.

18. The computer-readable storage medium of claim 17, wherein:
the specified cost savings goal comprises a monetary amount or a percentage relative to a baseline price; and
the determined variations comprise monetary amounts or percentages relative to the generated baseline price.

19. The computer-readable storage medium of claim 17, wherein the specified cost savings goal is for a particular combination of one or more items, suppliers, time frames, units within an organization, or personnel within an organization.

20. The computer-readable storage medium of claim 17, wherein the generated baseline price is selected from the group consisting of an average rolling twelve-month price, an average year-to-date price, an average previous calendar year price, and a last paid price.

21. The computer-readable storage medium of claim 17, wherein the one or more databases containing the historical transaction data comprise relational databases.

22. The computer-readable storage medium of claim 17, operable to access the historical transaction data, generate the specified baseline price, determine the variation for the one or more transactions corresponding to the specified cost savings goal, and compare the determined variations for the one or more transactions with the specified cost savings goal by causing one or more scripts designed for these activities to be executed.

23. The computer-readable storage medium of claim 17, further operable to monitor the determined variations and alert a user when at least one variation reaches a corresponding threshold.

24. The computer-readable storage medium of claim 17, further operable to access one or more classes within an object-oriented database system to generate one or more objects for conducting the cost savings analysis, each class comprising one or more properties for defining an object, each generated object comprising values for one or more of the properties within a corresponding class, the values being generated from one or more of the following:
- the first input;
- the second input;
- the historical transaction data; and
- one or more other generated objects.

\* \* \* \* \*